United States Patent
Rinne et al.

(10) Patent No.: US 9,281,917 B2
(45) Date of Patent: Mar. 8, 2016

(54) SHARED CONTROL CHANNEL STRUCTURE

(75) Inventors: Mika Rinne, Espoo (FI); Frank Frederiksen, Klarup (DK); Troels Kolding, Klarup (DK); Samuli Visuri, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1460 days.

(21) Appl. No.: 11/651,012

(22) Filed: Jan. 9, 2007

(65) Prior Publication Data

US 2008/0159323 A1    Jul. 3, 2008

Related U.S. Application Data

(60) Provisional application No. 60/878,079, filed on Jan. 3, 2007.

(51) Int. Cl.
| | |
|---|---|
| H04W 4/00 | (2009.01) |
| H04L 1/00 | (2006.01) |
| H04L 5/02 | (2006.01) |
| H04L 1/16 | (2006.01) |

(52) U.S. Cl.
CPC .............. *H04L 1/0004* (2013.01); *H04L 1/001* (2013.01); *H04L 1/003* (2013.01); *H04L 1/0007* (2013.01); *H04L 5/023* (2013.01); H04L 1/0013 (2013.01); H04L 1/0025 (2013.01); H04L 1/0039 (2013.01); H04L 1/1607 (2013.01)

(58) Field of Classification Search
CPC .... H04W 48/16; H04W 48/18; H04B 7/2643; H04B 7/2656
USPC ................... 455/434, 450, 446; 370/319, 347
See application file for complete search history.

(56) References Cited

U.S. PATENT DOCUMENTS

| | | | |
|---|---|---|---|
| 6,397,352 B1 | 5/2002 | Chandrasekaran et al. | |
| 6,615,371 B2 | 9/2003 | McCullough et al. | |
| 7,508,804 B2 | 3/2009 | Das et al. | |
| 2004/0190482 A1* | 9/2004 | Baum et al. | 370/347 |
| 2005/0048985 A1* | 3/2005 | Haartsen | 455/453 |
| 2006/0233124 A1* | 10/2006 | Palanki | 370/319 |
| 2009/0103562 A1 | 4/2009 | Frederiksen et al. | |

FOREIGN PATENT DOCUMENTS

| | | |
|---|---|---|
| EP | 1 990 926 A1 | 11/2008 |
| EP | 1 997 260 A1 | 12/2008 |

(Continued)

OTHER PUBLICATIONS

*The Authoritative Dictionary of IEEE Standards Terms*, 7th ed., p. 703 (IEEE 2000) (Exhibit1).*

(Continued)

*Primary Examiner* — Chuck Huynh
(74) *Attorney, Agent, or Firm* — Squire Patton Boggs (US) LLP

(57) ABSTRACT

A shared control channel structure includes at least one control channel to be allocated at least to a user for at least one of uplink and downlink directions in a network, which the at least one control channel is arranged as at least a part of a modular structure comprising of modular code blocks on at least two different sizes. One of such modular structures may be represented as a tree structure in particular, where each of the modular code blocks define one node of the tree, respectively.

53 Claims, 14 Drawing Sheets

(56) References Cited

FOREIGN PATENT DOCUMENTS

| GB | 2 436 416 A | 9/2007 |
| KR | 2003-0080202 A | 10/2003 |
| WO | 2004/086636 A2 | 10/2004 |
| WO | 2006/007292 A2 | 1/2006 |
| WO | WO 2006022876 A1 * | 3/2006 |
| WO | 2008/081004 A1 | 7/2008 |
| WO | 2008/137786 A1 | 11/2008 |
| WO | 2008/150124 A2 | 12/2008 |
| WO | 2009/040653 A2 | 4/2009 |

OTHER PUBLICATIONS

*Dictionary of Computing* (A & C Black Publishers 2004) (Exhibit 2).*
Korean Office Action, Korean Patent Application No. 10-2009-7016180, Date: Dec. 24, 2010, pp. 1-4, English Translation: pp. 1-3.
Chinese Office Action, with full English translation, dated Jul. 20, 2011, for corresponding Chinese Patent Application No. 200880005022.X.
Indonesia Office Action, with full English translation, dated Oct. 10, 2011, for corresponding Indonesia Patent Application No. W00200902134.
Japanese Office Action, with full English translation, dated Oct. 4, 2011, for corresponding Japanese Patent Application No. 2009-544398.
Jim Tomcik, "QFDD Technology Overview", IEEE C802.20-05-59 [Online], Oct. 28, 2005, pp. 1-70, URL, http://grouper.ieee.org/groups/802/20/Contribs/C802.20-05-59.pdf.
Canadian Office Action dated Aug. 30, 2011, for corresponding Canadian Patent Application No. 2,609,958.
Rosenberg et al., "SIP: Session Initiation Protocol", RFC 3261, Jun. 2002, pp. 1-248.
Chinese Office Action dated Sep. 28, 2011, for corresponding Chinese Patent Application No. 200780039255.7.
Japanese Office Action, with full English translation, dated Jun. 1, 2012, for corresponding Japanese Patent Application No. 2009-544398.
Chinese Office Action, with full English translation, dated Aug. 21, 2012, for corresponding Chinese Patent Application No. 200880005022.X.

* cited by examiner

SHARED CONTROL CHANNEL STRUCTURE

REFERENCE RELATED APPLICATION

This Application hereby claim the benefit under 35 USC 119(e) of U.S. provisional patent application Ser. No. 60/878,079, entitled "Control Channel with Unified Signalling Entries" filed Jan. 3, 2007, and naming the same four inventors. The disclosure of the prior application is hereby incorporated by reference herein in its entirety.

FIELD OF THE INVENTION

The invention, according to various embodiments, relates to shared control channel structure including at least one control channel to be allocated at least to a user for at least one of uplink and downlink directions in a network, a method for creating at least one control channel, an apparatus comprising a transmitter for creating at least one control channel, a receiver apparatus for receiving at least one control channel and a user equipment comprising a receiver for receiving at least one control channel.

BACKGROUND OF THE INVENTION

In wireless communication systems, such as the long term evolution (LTE) of the Universal Mobile Telecommunications System (UMTS) Terrestrial Access Network (UTRAN) in $3^{rd}$ Generation Partnership Project (3GPP), new functionalities or features for data channels, such as fast link adaptation, hybrid automatic repeat request, or fast scheduling in case of high speed downlink packet access (HSDPA), rely on rapid adaptation to changing radio conditions. To implement these features, a control channel is used to carry control information relevant for those terminal devices (or user equipments (UEs) in 3G terminology) for which data is available on the respective channel.

In particular, the LTE technology defines a packet radio system, where all channel allocations are expected to happen in short periods of sub-frames. This is motivated both by the packet radio technology but also by the availability of wide transmission band and high symbol rate transmission techniques, which enable high payloads even at short time intervals. This is contrary to the prior art 3G systems, where dedicated signalling channels are necessary to be set up even for packet traffic. It is also different from the WLAN type of allocations, where each IP packet transmission itself contains a transport header.

An adaptive coding concept may be applied to the control channel to expand the dynamic range of the control channel. Adaptive modulation of the control channel may also be considered. Power control of the control channel is feasible, but only a constrained dynamic range can be exploited due to interference impacts and hardware limitations.

To support different data rates on the control channel a range of channel coding rates may be supported. Hence, at least two formats, e.g., of coding scheme may be supported for the control signaling via the control channel. Adative modulation of the control channel is not necessary, but is feasible to be included in addition to the adaptive coding according to the invention, if necessary. The downlink (DL) control signaling may be located in the first n transmission symbols. Thus, data transmission in DL can at the earliest start at the same transmission symbol as the control signaling ends.

FIG. 1 shows an example of a design of one "mother" control channel out of a plurality of control channels. This mother control channel can be split into some "child" control channels by dividing the physical resources using a variable coding scheme for allocations. In this example, the channel size of a "mother" control channel is 360 channel bits which may correspond to 180 QPSK (quadrature phase shift keying) symbols. However, it is noted that the number of channel bits is a design parameter which may be used to adjust tradeoff between coverage and capacity. In FIG. 1 the upper part shows a case in which one user is allocated to the control channel, while the lower part shows a case in which two users are allocated within the same physical resources, each using a "child" control channel, corresponding to 180 channel bits following the abovementioned example. The control information conveyed via the control channel may be divided into allocation information 42 for the terminal device, a terminal identification 44 (e.g. user equipment identity (UEID), cell-specific radio network temporary identity (C-RNTI) etc.), and an error checking pattern 46 (e.g. cyclic redundancy check (CRC)). It is noted that the terminal identification 44 and the error checking pattern 46 may be merged, such that a terminal or user specific masking of at least a part of the error checking pattern can be achieved.

When decoding the control channel, the receiving end will have to know the size and/or length of the control symbol block (consisting of control information bits coded with the selected channel code rate) being decoded (in order to do channel decoding and error checks) prior to the actual interpretation of the information bits (i.e. content decoding). To illustrate, a situation is assumed where downlink allocation uses 80 bits. In the upper case of a single user and a channel size of 360 channel bits, an effective code rate of about 0.2 (i.e. 80/360=0.22), while in the lower case the effective code rate is increased to about 0.4, by reducing the channel size to 180 bits and still keeping the downlink allocation size to 80 bits. Now, if there are two formats available for the control signaling, the amount of users for downlink using format #1 and format #2, respectively, must be determined in order to know the size of each. The same applies to the allocations for the uplink direction. This information could be forwarded for example as separate category 0 (Cat0) information (control information for the control channel).

In particular in the enhanced universal terrestrial radio access (E-UTRA) air interface and B3G technologies, all data carrying resource allocations are signalled in downlink control channels, which are present in the first multi-carrier symbols of the sub-frame preceding the multi-carrier symbols of the data channels (of downlink and of uplink), wherein the control channels are separately coded.

In the prior art, the signalling channels may be received by following known channelization code sequences having a fixed spreading factor in a direct sequence spread spectrum system. These channelization code resources form a channel, which is time multiplexed for different UEs. Each UE following the known channelization code sequence may filter, by its UE specific identifier, for a match to find its time multiplexed activity periods.

Alternatively in the prior art, a control channel is provided, which is divided to consist of common signalling entries of UE groups so that the physical resource allocations are commonly announced for all these UEs and the UEs occupying each physical resource block (PRB) are indexed by short identifiers among that group.

SUMMARY OF SOME EXEMPLARY EMBODIMENTS

There is a need to provide an improved control signalling scheme, in particular by efficiently creating a control channel structure and signalling entries for allocations, which are provided for short sub-frame periods.

In accordance with a first aspect of the present invention, there is provided a control channel structure including at least one control channel to be allocated at least to a user for at least one of uplink and downlink directions in a network, which the at least one control channel is arranged as a modular structure comprising modular code blocks of at least two different sizes.

Preferably, the modular structure forms a tree, where each of the modular code blocks defines one node of the tree, respectively.

In accordance with a second aspect of the present invention, there is provided a method for creating at least one control channel to be allocated at least to a user for at least one of uplink and downlink directions in a network, wherein the at least one control channel is arranged as a modular structure comprising modular code blocks of at least two different sizes.

In accordance with a third aspect of the present invention, there is provided an apparatus comprising a transmitter for creating at least one control channel to be allocated at least to a user for at least one of uplink and downlink directions in a network, so that the at least one control channel is arranged as a modular structure comprising modular code blocks of at least two different sizes.

In accordance with a fourth aspect of the present invention, there is provided a receiver apparatus for receiving at least one control channel allocated at least to a user for at least one of uplink and downlink directions in a network, which the at least one control channel is arranged as a modular structure comprising modular code blocks of at least two different sizes, comprising a searcher for searching for an appropriate code block in the modular structure of at least one control channel In accordance with a fifth aspect of the present invention, there is provided a user equipment comprising a receiver for receiving at least one control channel allocated to the user equipment for at least one of uplink and downlink directions, which the at least one control channel is arranged as a modular structure comprising modular code blocks of at least two different sizes, and further comprising a searcher for searching for a user equipment specific identifier in the modular structure of the at least one control channel.

Further advantageous embodiments are defined in the dependent claims.

According to an embodiment of the present invention, there may be provided an apparatus creating a signalling channel structure of separately coded blocks forming a modular structure, e.g. a coding tree, and a receiver apparatus to search for control channels in the mentioned modular structure i.e. a tree by its receiver specific radio network identifier and search algorithms.

Further, there may be provided means (in the transmitter) to create and (in the receiver) to receive unified signalling entry formats for correct operation of transmission and reception.

According to another embodiment of the present invention, the control channel forms a modular structure e.g. a coding tree of variable channel code rates. The nodes of the tree may consist of signalling entries coded by a given code rate. The signalling entries (of information bits) may be of different types and may have different Information Block Length (IBL). Each signalling entry type may follow a unified entry format. Each Information Block of a signalling entry may be coded, rate matched and modulated exactly to the sub-carrier symbols forming a coded node of the tree.

The receiver may include means to search for a UE specific MAC ID in the nodes of the control channel, e.g. a tree. This allows UE specific separate coded control channels with limited and optimized number of searches, due to the modular structure of the control channels.

The eNB (E-UTRAN Node B) may comprise means to allocate the sub-carrier resources of multi-carrier transmissions flexibly between the control channels in a modular structure.

In accordance with the present invention, the control channel is implemented as a tree, where each node of the tree consists of exactly known sub-carrier resources, which may comprise of a modulated code block, wherein however the system bandwidth is essentially not changed. The tree structure allows efficient search of a matching control channel, since it has been found that a search result at a given node of the tree allows deduction of candidate searches in the next higher level of the tree. This is not feasible with other arbitrary but systematic mapping schemes. Without the modular structure e.g. a tree i.e. having an arbitrary and systematic mapping of control channels to the sub-carrier resources, the number of required searches becomes large, which is not the case with the present invention.

The modular structure of the control channel(s) according to the present invention is advantageous in enabling searching and decoding processes by the user. In particular, the modular structure according to the present invention allows for a parallelization of the searching and decoding processes (i.e. decoding simultaneously from multiple candidate places of channels, in particular physical downlink control channels, before knowing the results of decoding tests on other candidate channels. Moreover, the modular structure according to the present invention renders it possible to search and decode in the control channels in any favoured order, in particular from the largest control channel to the smallest control channel, from the smallest control channel to the largest control channel, and from the control channel, whose SINR (signal-to-noise ratio with the noise including both formal noise and interference) is closest to the expected SINR value at the receiver (as the transmitter is expected to power control respectively), to the SINR deviating more from the expected SINR. Further, the present invention renders it possible to limit per each user the number of the searching and decoding processes. The modular structure further allows for efficient usage of all sub-carrier resources available in the downlink control signalling part of a sub-frame. A maximum number of users allocated per sub-frame may be provided depending on the transmission resources required by their signalling. Moreover, a discrete structure of control channels is created, despite of their variable information block length and (IBL) and effective code rate (ECR). Moreover, the modular structure according to the present invention allows for a transport of each control channel, in particular physical downlink control channel, by a defined modulation, by an effective code rate selected from a defined effective code rate set, by power balancing of sub-carriers between the other control channels, by power addition of the control channel from un-used sub-carriers, and/or by a large amount of frequency diversity. Finally, the present invention may result in reasonable limitation per user to the configurability of the control channels which each user is mandated to code.

BRIEF DESCRIPTION OF THE DRAWINGS

The present invention will now be described based on embodiments with reference to the accompanying drawings in which.

DESCRIPTION OF PREFERRED
EMBODIMENTS

In the following, various embodiments of the invention will be described based on a wireless transmission system, such as evolved UTRA (E-UTRA). The embodiments of this invention are not limited for use with only this one particular type of wireless communication system, and that they may be used to advantage in other wireless communication systems such as wireless ad hoc networks, cognitive radios, beyond third generation (B3G) systems and fourth generation (4G) systems, as non-limiting examples.

As a non-limiting example, mathematical transforms may be used to create multi-carrier symbols. As non-limiting examples of such mathematical transforms, an OFDM multicarrier signal may be generated by discrete Fourier transforms or by fast Fourier transforms. Other non-limiting, exemplary transforms that may be used to generate multicarrier signals include cosine transforms, sine transforms, filterbank transforms and bi-orthogonal transforms. The properties of these transforms differ from the properties of OFDM, but they may be applied similarly to create a multicarrier transmission. Even blocked transforms or interleaved transforms (IFDMA) may be used to create similar transmission schemes, where a block of symbols is available on a number of frequency bins at a time. In reference to E-UTRA technology, the terms "multicarrier symbol" and "OFDM symbol" are used interchangeably. For other B3G technologies, the term "multicarrier symbol" may be considered more generic.

Figure 1:
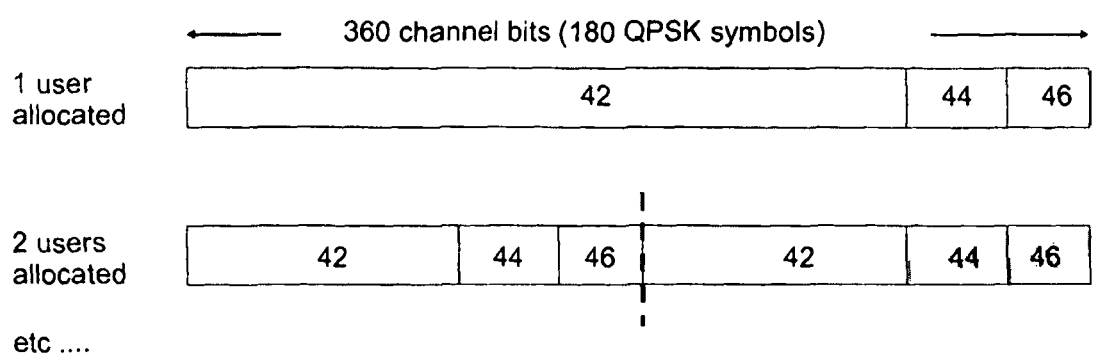
FIG. 1 schematically shows a principle example of a control channel design using variable coding schemes.
Figure 2:
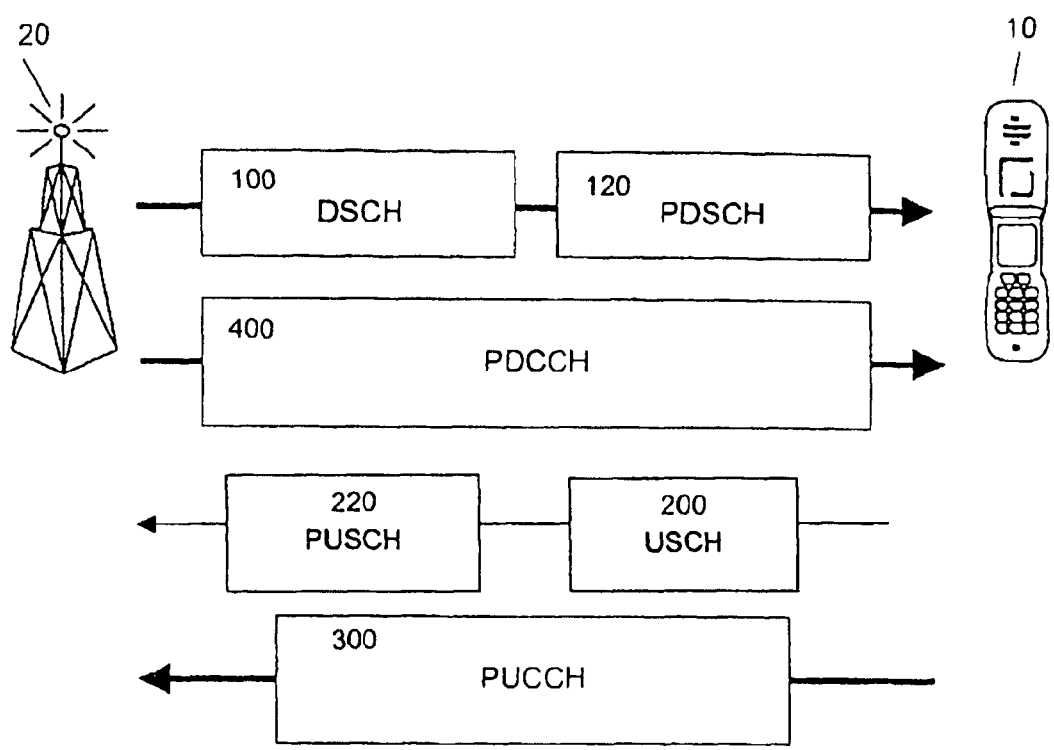
FIG. 2 shows a schematic diagram indicating channels used for communication in an enhanced wireless network.

FIG. 2 shows a schematic diagram of a general network and channel architecture in which the invention, in an exemplary embodiment, can be implemented. A radio access network provides access to a UE 10 via an access device 20, e.g., a base station device, a node B, or an access point, having a scheduler functionality for scheduling resources by allocating physical resource blocks to users which have connectivity to the access network. Data and control signalling is performed using specific channels indicated in FIG. 2.

A DL shared channel (DSCH) 100 is provided as a shared transport channel, which means that the available bandwidth is flexibly and dynamically shared among the served active users. Fast scheduling in frequency shares the DSCH 100 for a period of a sub-frame among the users, scheduled in time, from the set of all served users. This exploits multi-user diversity and allocates more bandwidth to users with more demand and allocates more bandwidth with more favourable radio conditions to each user. A scheduler can base its decisions for example on predicted channel quality (in time and in frequency), the current load of the cell and the traffic priority class (real-time or non-real-time services). Additionally, a physical downlink shared channel (PDSCH) 120 is provided as a physical channel for carrying high-speed bursty data to users. Similarly, a uplink shared channel (USCH) 200 is provided as a shared transport channel, and a physical uplink shared channel (PUSCH) 220 is provided as a physical channel for carrying high-speed bursty data from users. Feedback information (e.g. acknowledgements, channel information etc.) in the uplink (UL) direction from the UE 10 to the access device 20 is signalled via a physical uplink control channel (PUCCH) 300.

Additionally, a physical downlink control channel (PDCCH) 400 is provided as a physical signalling channel to convey control information related to at least one of the PDSCHs 120 in downlink and PUSCH in uplink directions or to perform hybrid automatic repeat request (HARQ) signalling.

The transmissions on downlink and uplink may apply a frequency division duplex or time division duplex arrangement.

Fast link adaptation enables the use of more spectrally efficient modulation when channel conditions permit. With favourable channel conditions 16 quadrature amplitude modulation (QAM) or even 64 QAM may be used for example, while QPSK may be used when unfavourable or less favourable channel conditions or large penetration loss are faced, or when a wide area coverage is expected.

Additionally, the coding rate may be adapted, wherein a coding rate of 1/4 means that error correction and detection takes 75 percent of the bandwidth and the user data rate is only 25 percent of the coded symbol rate. Likewise, a coding rate of 4/4 means that the user achieves the maximum data rate, but there is no error correction, and therefore many errors are expected in the received data, which decreases the throughput due to error recovery retransmissions.

As an additional measure, adaptive modulation and coding (AMC) schemes may be used for link adaptation. These schemes enable the system to change the coding and modulation schemes. The channel condition has to be measured or estimated based on the feedback of the receiving end. Links with better transmission conditions can be assigned a higher order modulation scheme and higher coding rates. The benefits of AMC include availability of instantaneously high data throughput and high efficiency with low interference variation because it is based on modulation and coding adaptation instead of e.g. variations in transmit power.

Link adaptation is the process of modifying transmission parameters to adapt to the experienced channel parameters. Higher order modulation, in conjunction with channel coding, optimizes the use of a fading radio channel. By transmitting at constant power, the modulation and coding schemes (MCS) can be selected to maximize throughput. A media access control (MAC) layer functionality at the access device selects the MCS that matches the instantaneous radio conditions depending on a short transmission time interval (TTI) and depending on the selected frequency resources selected for the payload. This applies similarly for downlink and uplink transmissions, even in case their MCS choices are independent. The MCS selection may depend on for example channel quality indication, instantaneous power of the physical channel, quality of service (QoS) demands of the requested service, or experienced buffering queue sizes.

In an embodiment, a limit is put on the MCS format settings for the physical downlink control channel PDCCH 300 such that it is only possible to fit an integer number of allocations within a fixed number of sub-carriers (in the system bandwidth) on a given number of multicarrier symbols (in time dimension). That is, basically, a known set of sub-carriers are reserved for each allocation for a downlink signalling, for an uplink signalling or for signalling both of them in the same PDCCH. Then, if a user being allocated is in a poor channel condition, the MCS will be set such that all sub-carriers will be used for this user. That is, the mother control channel is fully allocated to this user. If e.g. the channel conditions for other users are such that two or more users will fit within the mother control channel (i.e. set of sub-carriers), it will be split into a multiple of child control channels, so that these users will share the allocation set of sub-carriers of the mother control channel, while separate coding may still be used for each user so that they use a less robust MCS for their resource allocation information present in one of the child control channels.

Hence, a full downlink signalling resource available as a number of sub-carrier symbols (up to all sub-carrier symbols available in the system bandwidth) on a defined multicarrier symbols of the sub-frame (up to all multicarrier symbols of the sub-frame) can be split into a plurality of control channels. These downlink signalling resources will consist an integer number of mother control channels and a respective larger integer number of child control channels.

These structures will allow several possible alternatives of allocations. E.g., in the sub-carrier resources where a mother control channel is allocated, there are no feasible allocations on the child control channels. Similarly, in the sub-carrier resources where mother control channels are not allocated, it is possible to have a larger number of allocations on the respective child control channels. A single mother control channel can then individually be split into child control channels. Thus, any mixture of allocations consisting of a number of mother control channels and a number of child control channels may be feasible as long as each of the sub-carrier symbols are modulated by a unique symbol content. There exists a versatile number of allocations possible in the modular control channel structure consisting of large number of sub-carrier resources. Even for a smaller number of sub-carrier resources available (e.g. due to limited system bandwidth), a more limited number of allocations will be possible, but still their versatile arrangement is feasible according to the modular control channel structure.

Figure 3:
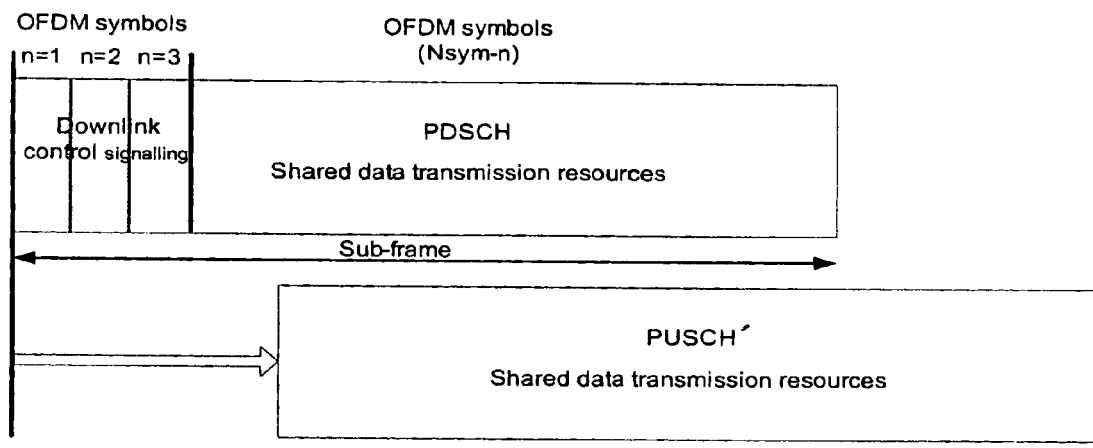
FIG. 3 is a schematic diagram showing the time multiplexing of downlink control signalling and shared data transmission resources of one sub-frame according to an embodiment.

Every downlink sub-frame is time multiplexed to consist of downlink control signalling resources and the physical downlink shared channel (PDSCH). The downlink control signalling precedes the shared data transmission resources of the downlink and the uplink, as shown in FIG. 3. These downlink control signalling resources actually may carry multiple Physical Downlink Control Channels (PDCCH), each of which carries information for one MAC ID. This means that for each UE the signalling blocks are separately coded.

Figure 4:
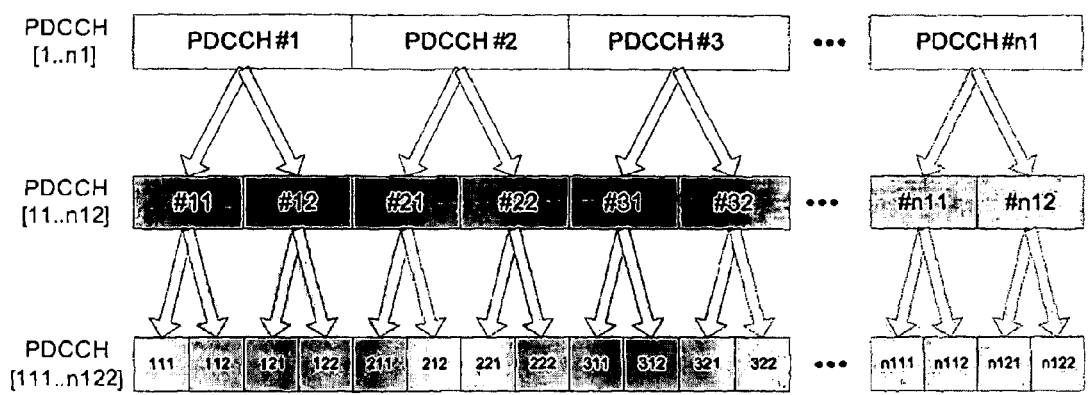
FIG. 4 shows a schematic diagram of an arrangement of a plurality of physical downlink control channels in a modular structure according to an embodiment.

The multiple control channels are proposed to be arranged as a modular structure of code blocks of different sizes in terms of used physical channel bits, as shown in FIG. 4, such that a control channel of the largest code block may be replaced by up to two control channels of half the size. Further, one control channel of half the size may be replaced by up to two control channels of quarter the size of the largest code block. Due to the arrangement as a modular structure, the UE is able to find the candidate PDCCHs efficiently from a possible set of alternatives. As different signalling entry types (e.g. a downlink allocation, an uplink allocation, etc.) are of different information block length (IBL) and they are possibly encoded with a different channel code rate for different UEs, their usage of sub-carrier symbol resources varies a lot.

Figure 5:
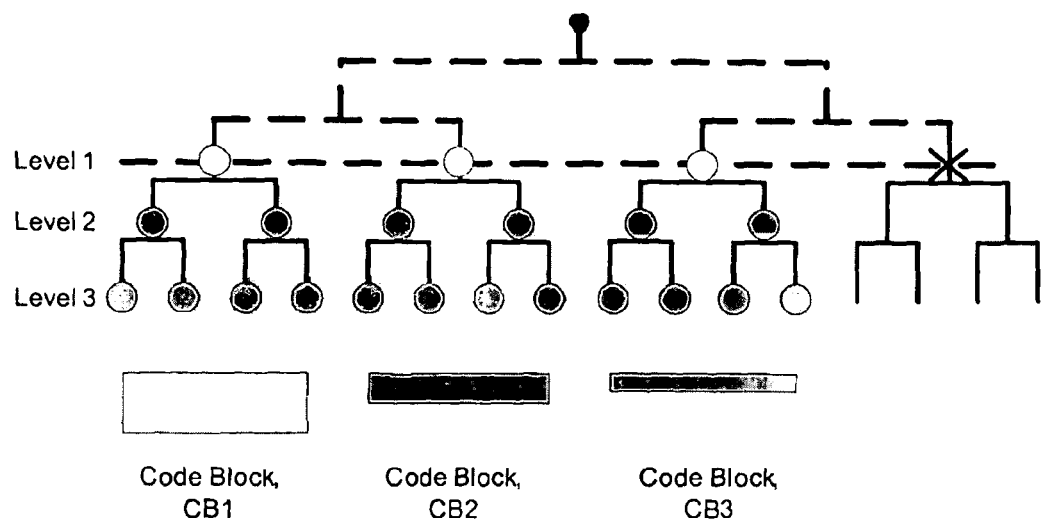
FIG. 5 shows a schematic diagram of a physical downlink control channel in a tree of code blocks arrangement according to an embodiment.

The structure is alternatively presented as a tree as shown in FIG. 5 wherein the largest code block is named "CB1", the control block of half the size of CB1 is named "CB2", and the code block of quarter the size of CB1 is named "CB3". Each code block is called a control channel as it carries information for one MAC ID. The MAC ID is used by a UE or by a group of UEs to detect the channel. At each level of the tree, each node represents a single control channel of a code block, which may consist of an information block of given length (information block length IBL) coded with an effective code rate (ECR). The number of the control channels at the lowest level of the tree is determined by the system bandwidth and number of OFDM symbols (n) available for the largest code blocks. Any node of the tree, which is not occupied by a control channel in this level, is available for the next level of the tree as two control channels, each of which are half of the size of the control channel at the parent node.

The system bandwidth consisting of a given number of sub-carrier resources may be divided into an integer multiple of control channels. In the embodiment of FIG. 5, a given node of the tree, i.e. a set of sub-carriers, can consist of one control channel of the largest code block, of up to two control channels of the second largest code blocks or up to four control channels of the smallest code blocks. Here, it is assumed that each code block of the lower level in the tree is double the size of the code block in the previous higher level in the tree. Rate matching is used to adjust the IBL with the selected code rate exactly to the sub-carrier resources forming a node of the tree. In case some nodes do not contain any control channel, the sub-carriers are thus not modulated with data and do not consume transmission power.

Figure 6:
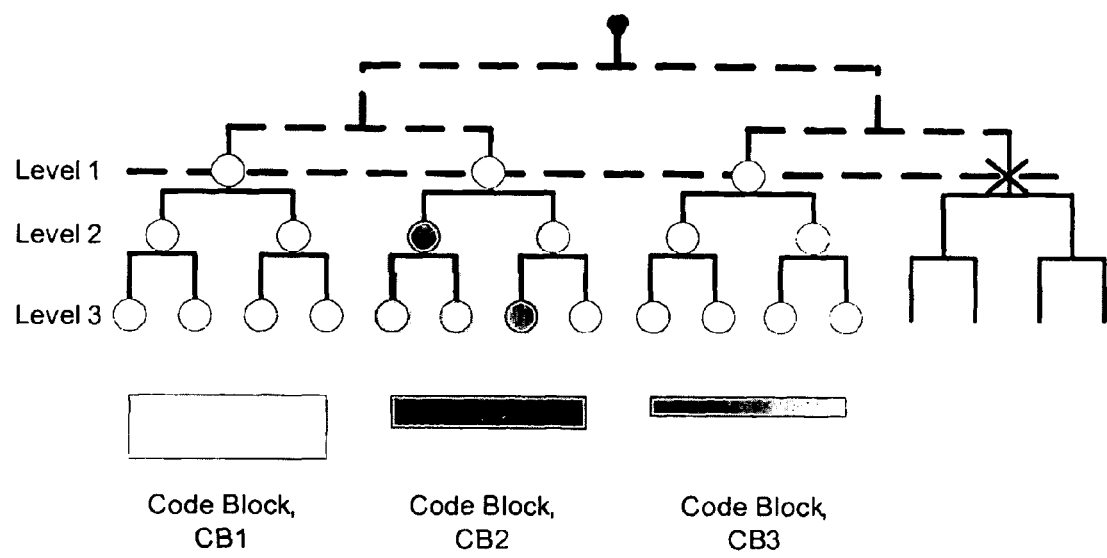
FIG. 6 shows a schematic diagram of a physical downlink control channel in a tree of code blocks arrangement with three allocated nodes in different levels of the tree according to an embodiment.

FIG. 6 schematically shows an example of a tree with three allocated nodes (one defined by CB1, another one defined by CB2, and yet another one defined by CB3) in different levels of the tree.

Figure 7:
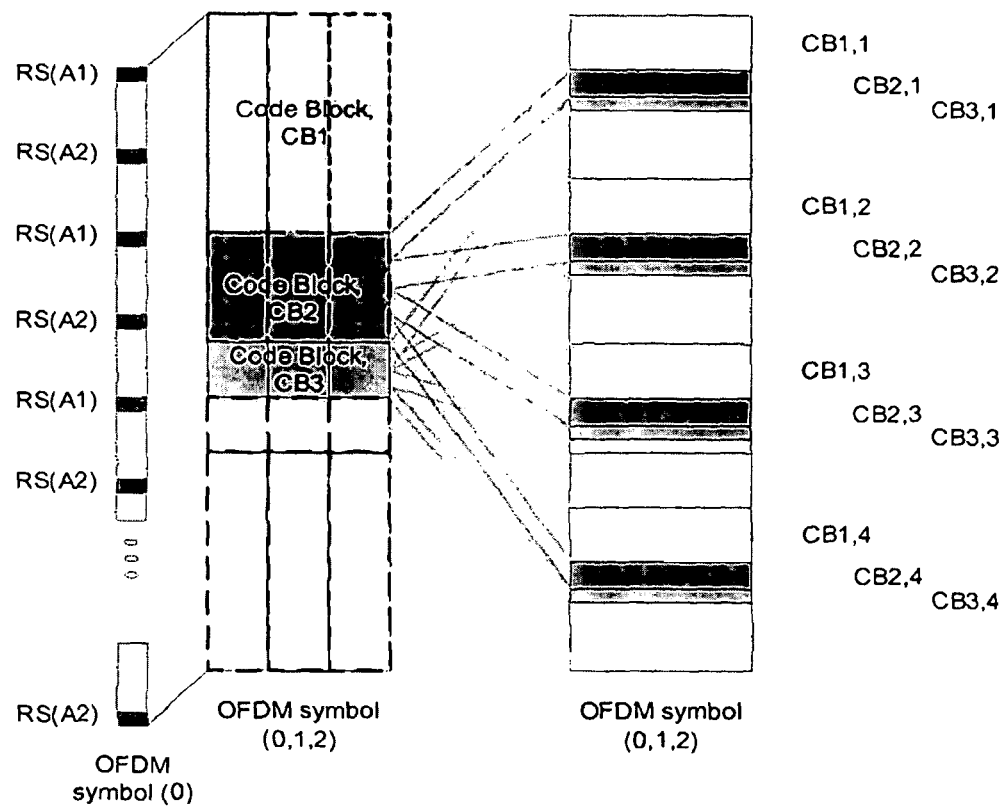
FIG. 7 shows an example of a tree with three allocated nodes mapped to sub-carrier resources in a distributed manner according to an embodiment.

FIG. 7 schematically shows an example of a tree with three allocated nodes (one defined by CB1, another one defined by CB2, and yet another one defined by CB3) mapped to the sub-carrier resources in a distributed manner. The PDCCH is distributed over the system bandwidth. Each code block on the PDCCH is distributed to a set of sub-carriers. E.g. CB1 consist of CB11, CB12, CB13, CB14; CB2 consists of CB21, CB22, CB23, CB24; and CB3 consists of CB31, CB32, CB33, CB34.

In FIG. 7, "RS (A1)" and "RS (A2)" show the presence of reference symbols for two antennas in the first OFDM symbol of the sub-frame.

Figure 8:
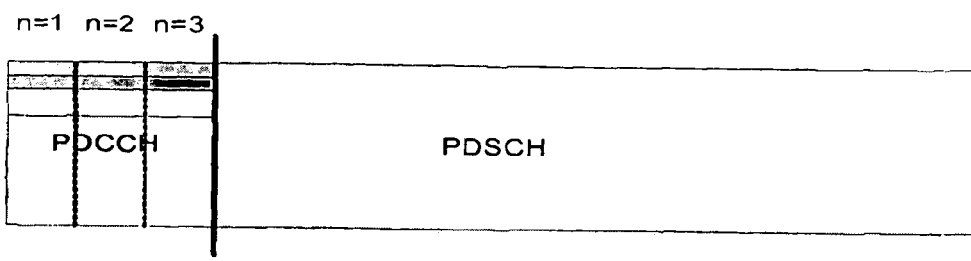
FIG. 8 shows a schematic diagram of the distribution of control channels over the system bandwidth to one, two or more OFDM (orthogonal frequency division multiplexing) symbols in a sub-frame according to an embodiment.

Each control channel extends entirely over the first n OFDM symbols, which are available for the control channels, as shown in FIG. 8. The PDCCHs are entirely frequency multiplexed to the sub-carriers on all of the OFDM symbol resources available for control signalling, as also shown in FIG. 8. This enables efficient power balancing between the PDCCHs so that each of them meets the expected SINR at the intended UE receiver.

As frequency diversity is known to provide gains, every PDCCH may actually be proposed to be modulated to a distributed set of sub-carriers as shown in FIG. 7, instead of constitutive ones as shown in FIG. 8.

Figure 9:
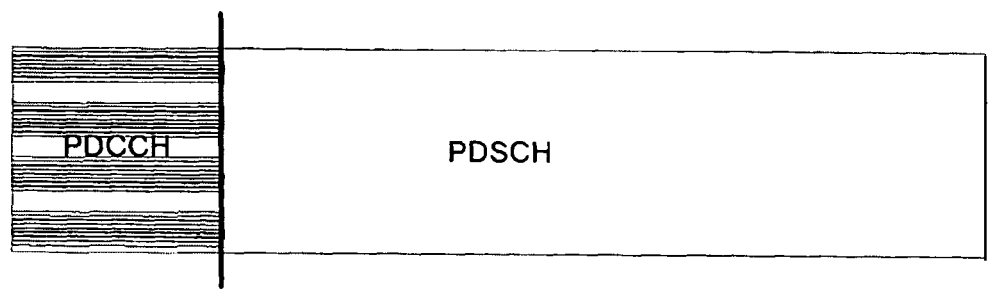
FIG. 9 shows a schematic diagram of the distribution of control channels over the system bandwidth to three OFDM symbols in a sub-frame according to another embodiment.

Actually the control channels are distributed over the system bandwidth to the sub-carriers on one, two or three OFDM symbols in that sub-frame, to maximize the frequency diversity so that there are e.g. four distributed sets of sub-carrier resources allocated per each code-block. This is illustrated in FIG. 9.

Figure 10:
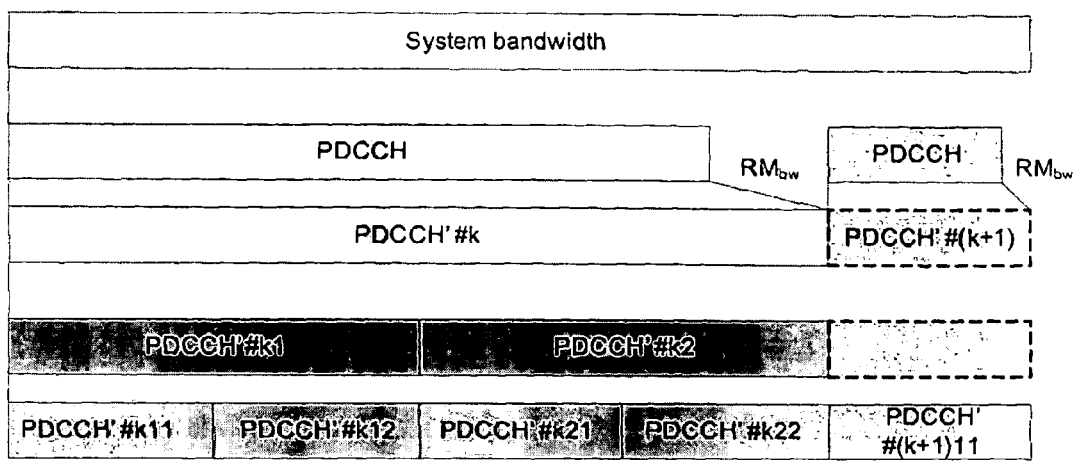
FIG. 10 is a schematic diagram showing that the system bandwidth is divided to an integer number of modular PDCCHs according to an embodiment.
Figure 11:
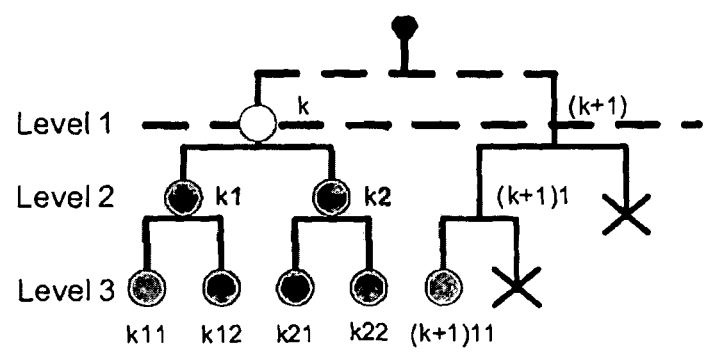
FIG. 11 schematically shows an example of the modular structure of PDCCHs of FIG. 10.
Figure 12:
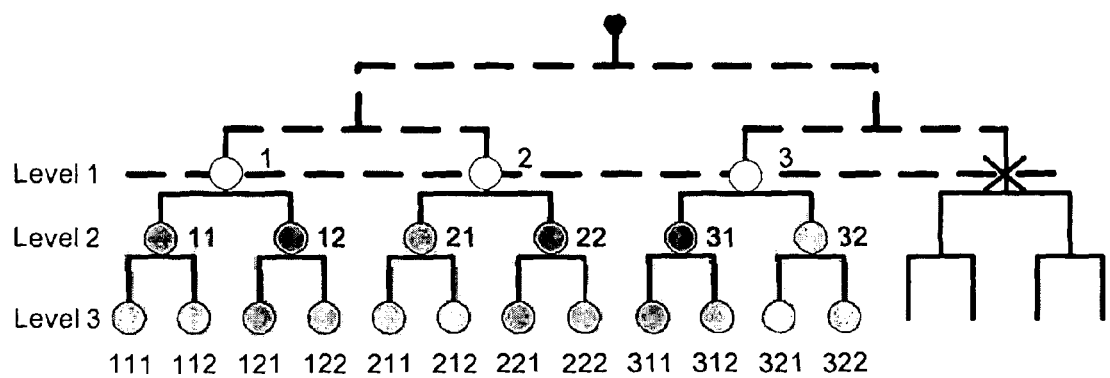
FIG. 12 schematically shows a more general example of the modular structure of PDCCHs represented as a tree according to another embodiment.

FIG. 10 is a schematic diagram showing an embodiment wherein the system bandwidth is divided to an integer number of modular PDCCHs. FIG. 11 gives an example of a tree representation of the structure shown in FIG. 10, wherein each node of the tree corresponds to a defined set of sub-carriers. A more generic representation of a tree structure, which is compatible to that of FIG. 4 (with n1=3), is given in FIG. 12, wherein again each node of the tree consists of an exactly defined set of sub-carriers.

Figure 13:
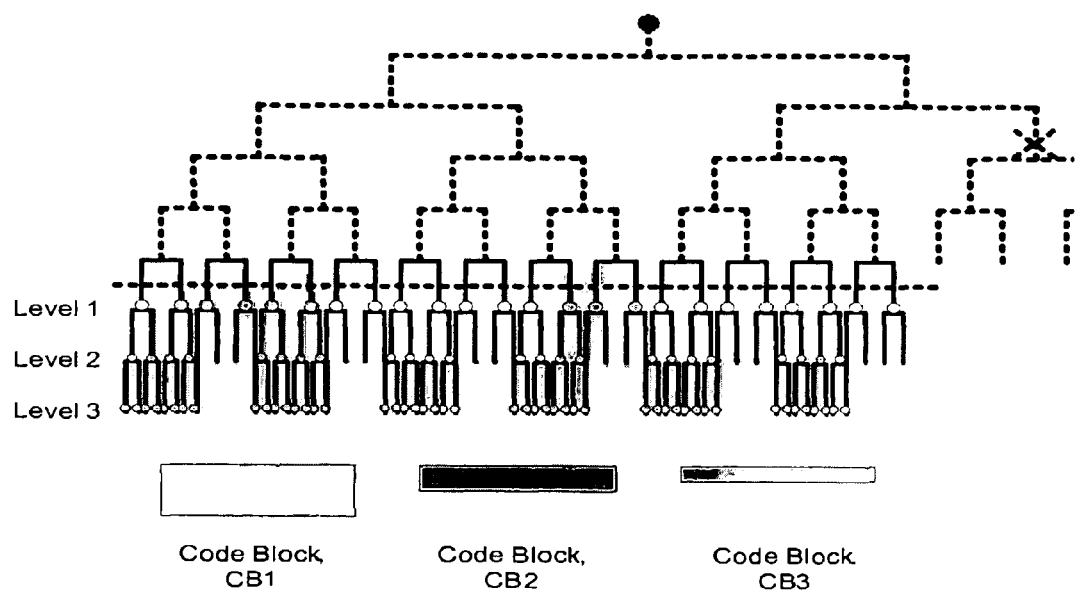
FIG. 13 shows a schematic diagram of a physical downlink control channel in a tree of code blocks arrangement in case of a wide system bandwidth wherein the allocated three levels of the tree are higher in the tree (from the root of the tree) compared to a tree on a narrow system bandwidth according another embodiment.

FIG. 13 schematically shows a further example of a tree on a wide system bandwidth wherein the allocated three levels of the tree are much higher in the tree compared to a tree of a narrow system bandwidth as e.g. shown in FIGS. 5 to 8 and 10 to 12.

As each control channel has to be uniquely identified by a MAC ID, it can be combined to the CRC by partly masking the CRC bits with the MAC-ID. As the MAC ID is used for addressing both UE specific control channels and common control channels, it is reasonable to define the MAC ID in a compatible way. MAC IDs are reserved from the C-RNTI address space. Thus, reception of any control channel is possible by filtering control channels with the respective MAC ID. An error detection is available from the MAC ID masked CRC. The length of the MAC ID is matched to the C-RNTI length of 16 bits, but the CRC may be selected to be 16 or 24 bits.

The identification of an individual UE in a cell is based on the C-RNTI, which is signalled to the UE when changing from a LTE idle state to a LTE active state or when making a handover to a new cell. Thus, the C-RNTI can be directly used as the MAC ID of a control channel for an individual UE.

For paging signalling, a commonly available MAC ID is assigned (called PG-RNTI). This may be informed in the system information. Thus, any UE may filter possible paging allocations in sub-frames belonging to its DRX (discontinuous reception) active cycle by the commonly known MAC ID available for the PCH (paging control channel). The PCH itself is modulated to the data part of the sub-frame.

The identification of a control channel for a RACH (random access channel) response is derived from the resources used for the RACH burst creation by the UE. Thus, the RACH sub-frame, the RACH frequency resource and the RACH preamble index can together be applied to determine the MAC-ID (called RA-ID for the case of RACH response) to let the UE receive the RACH response in any one of the downlink sub-frames following that RACH transmission.

The identification of a group of UEs in a cell is based on assigning group IDs from the C-RNTI address space. Thus, a UE may have both its individual C-RNTI and a group ID valid simultaneously and may filter the MAC ID for the reception of a control channel with either the C-RNTI, with the group ID or with both of them.

There exist different types of signalling entries on the control channels. Each entry type follows a given bit exact format and has a defined relation to the other formats. It will be possible to provide future signalling entries or modify the existing ones. This may require changes to the known rate matching factors to fit them to the modular control channel structure e.g. to the nodes of the tree.

Figure 14:
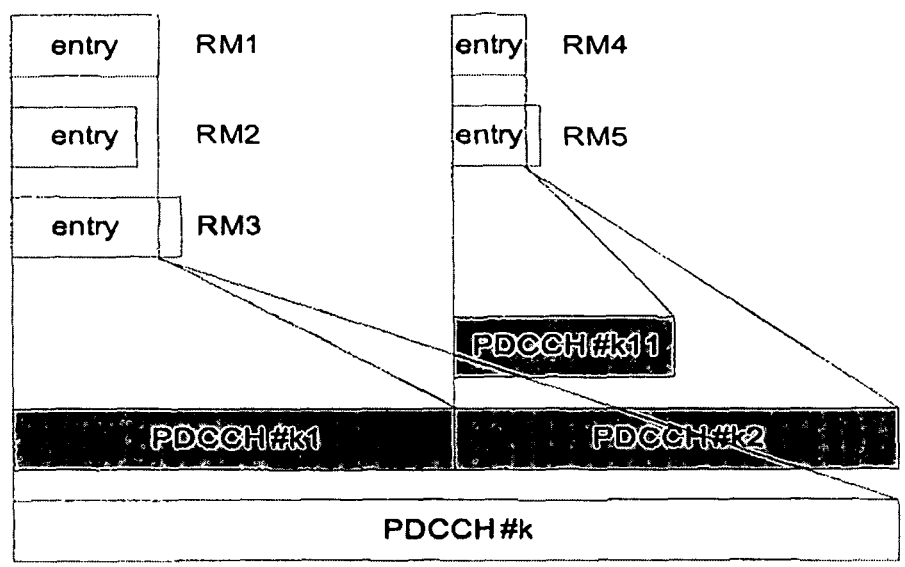
FIG. 14 shows a schematic diagram of rate matching of signalling entries to a modular structure of PDCCHs according to an embodiment.

So, as different signalling entry types need to be defined (e.g. for a downlink allocation, an uplink allocation etc.), their IBL may not be equal since each of them is minimized in bits as much as feasible. In order to keep the coded PDCCH structure modular, any given signalling entry has to be rate matched to the exact set of sub-carrier resources selected for that PDCCH. Rate matching guarantees that the symbol resources of the PDCCH are exact and modular as shown in FIG. 14, wherein the largest signalling entries for the lowest ECR are met to the largest PDCCH (PDCCH#k). Those coded ones with a higher ECR are mapped to the PDCCHs of half the size of the largest PDCCH (as PDCCH#k1). The smallest signalling entries with the highest code rate are mapped to the smallest PDCCHs (as PDCCH#k11). If they apply to a lower code rate, they are mapped to the double size PDCCH (as PDCCH#k2).

The flexibility of rate matching is a large benefit, because the signalling entry types anyway need to be standardised exactly. Now, any future update to the signalling fields would cause problems in the legacy decoders searching for PDCCHs of presumed size. However, due to the modular structure, the code block sizes are kept constant even with the future updates and just new rate matching factors have to be standardized respectively. Thus, the modular structure is possible to be searched through consistently both by the previously defined rate matching factors and newly defined rate matching factors. All the code blocks realizing the previously defined (legacy) rate matching factors can be found normally despite of possible presence of entries with the new rate matching definitions. Vice versa, the code blocks realizing new rate matching factors can be found normally despite of possible presence of entries with the old rate matching definitions.

Types of signalling entries may at least be
    downlink signalling entry,
    uplink signalling entry,
    paging signalling entry,
    RACH response signalling entry,
    uplink acknowledgement signalling entry, and/or
    Cat0 signalling entry.

Further types of signalling entries may at least be
    downlink group signalling entry wherein VoIP (voice over IP (internet protocol)) is the main driver,
    uplink group signalling entry wherein VoIP is the main driver, and/or
    downlink signalling entry for two code word MIMO (multiple input multiple output).

The proposed bit-fields for downlink signalling entry may include

UE dedicated MAC ID (identification by the C-RNTI [16 bit]),
CRC [8 bit] (in addition to UE ID masked CRC of 16 bits) wherein for narrowband CRC [0 bit] is sufficient,
indicator of the allocated physical resource [$DLA_{bw}$ bit] depending on the bandwidth wherein any PRBs can be flexibly allocated and F-FDM-various optimization schemes are proposed,
transport format of the allocation [5 bit],
HARQ control information [5 bit] wherein the asynchronous HARQ may comprise a 3-bit HARQ process number and/or 2-bit redundancy version (a bit combination acts as a new data indicator), and/or
other information, MIMO etc.

The proposed bit-fields for uplink signalling entry may include

UE dedicated MAC ID (identification by the C-RNTI [16 bit]),
CRC [8 bit] (in addition to UE ID masked CRC of 16 bits) wherein for narrowband CRC [0 bit] is sufficient,
indicator of the allocated physical resource [$ULA_{bw}$ bit] depending on the bandwidth wherein only adjacent resource units can be allocated to one UE, wherein indexes of the first and the last resource units are signalled and/or an actually index of the first RU and the number of allocated RUs would be shorter or equally short than the above, but result in variable fields,
duration of allocation [2 bit] which can be embedded to the other bit fields, e.g. TFI in this case, and may be needed specially for the RRC_Connection_Request message in coverage critical situations (as segmentation is not allowed),
transport format of the allocation [5 bit],
HARQ control information [2 bit] wherein the synchronous HARQ may comprise a 2-bit redundancy version (a bit combination acts as a new data indicator),
power control [5 bit] every $k_{PC}$ sub-frames,
timing advance [4 bit]—every $k_{TA}$ sub-frames, and/or
other information, MIMO etc.

The proposed bit-fields for paging signalling entry may include paging dedicated MAC ID, PG-RNTI [16 bit]
CRC [0 bit] (UE ID masked CRC of 16 bits)
indicator of the allocated physical resource [$PGA_{bw}$ bit] depending on the bandwidth with a diversity transmission of PRBs over the system bandwidth up to 600 sub-carriers, and/or
transport format of the allocation [5 bit].

The proposed bit-fields for RACH response signalling entry may include

RACH response specific MAC ID, RA-ID [16 bit] wherein the RA-ID include a preamble index part for the time, frequency and sequence index of the RACH burst
CRC [0 bit] (RA-ID masked CRC of 16 bits)
timing Advance Long [10 bit], and/or
power setting [5 bit].

The proposed bit-fields for uplink acknowledgement (ACK) signalling entry may include a HARQ ACK/NAK (negative acknowledge character) list in the order of the previous uplink allocations [max number of ACK/NAKs] with 1 bit per previous allocation.

The previous uplink allocations of a sub-frame (k−Δk) are acknowledged in a given downlink sub-frame (k) after a fixed delay (~1.5 or 2.5 ms to be defined) in a list format. For decoding an AN (ACK/NAK) bit in the sub-frame (k), it is sufficient for a UE to know in which node the allocation was given (in sub-frame k−Δk).

It is to be noted that many of the bit-fields are bandwidth dependent, e.g. the UE-identification and CRC in total may consist of 16 bits for narrowband and up to 24 bits for wideband. Also allocation indication depends largely on the bandwidth, as maximum of 6 bits are sufficient for 1.25 MHz bandwidth, but 100 bits were needed in maximum for 20 MHz. This is why the number of bits required to signal the allocation in a bandwidth dependent way is noted here as $DLA_{bw}$ of downlink allocation as a function of the system bandwidth, $ULA_{bw}$ of uplink allocation as a function of the bandwidth and $PGA_{bw}$ of paging allocation as a function of the system bandwidth.

An entry ID may be necessary, unless the entry type can uniquely be recognised from its IBL and/or type of the MAC ID. Paging entry may be uniquely recognized from its MAC ID wherein PG-RNTI does not match with any UE specific C-RNTI. The RACH response entry may be uniquely recognised from its MAC ID wherein RA-ID does not match with any UE specific C-RNTI. Thus, the downlink signalling entry, the uplink signalling entry, the downlink group signalling entry, the uplink group signalling entry may require an entry ID.

The tree is dimensioned so that the lowest level of the tree contains enough nodes to support the required maximum number of most robust code blocks on the deployed system bandwidth. These code blocks determine the maximum number of 'cell edge' users per sub-frame. On the other hand, the tree must contain enough nodes to enable allocations up to the maximum number of users per sub-frame. The depth of the tree is determined by the product of the number of IBLs and number of code rates available.

In a preferred embodiment there are at least two clearly different IBLs and at least two different code rates so that the depth of the tree is at least 3. All the other IBL tunings can be satisfied by rate matching as explained below.

Once the maximum size of the tree is known, it is calculated to how many OFDM symbols (in maximum) it is mapped onto. This depends on the system bandwidth, as the sub-carrier resources are largely different for different bandwidths.

The tree may be pruned so that all the nodes are not possible to be allocated in all the levels of the tree. Still, all the sub-carriers available are possible to be allocated. The pruned tree can be signalled easily by indicating, which nodes at which level of the tree are actually available for allocations. (this is a common information for the transmission and may be statically signalled e.g. in the system information messages.) Pruning will just reduce the number of possible allocation combinations so that the search complexity for the UEs is reduced. Despite of the pruning, there will remain a sufficient and even overwhelming number of PDCCH combinations available. The opportunities and also the needs of pruning appear more for a wideband system than for a narrower bandwidth.

As searching in the tree, even the pruned one, takes UE processing time, it may be feasible to decide a sub-set of nodes, which each UE is expected to decode for detecting any of its allocation. This UE specific set of nodes of the tree may be signalled to the UE in advance by the radio resource control (RRC) signalling e.g. during the initial access. The number of nodes (control channels) to decode may partly depend on the UE capability. Any UE however has to be able to decode the possible code blocks of the paging entry, the AN entry and a given number of alternative nodes for downlink and uplink signalling entries. The number of control channel positions for downlink and uplink signalling entries have still to include several alternatives at different levels of the tree (effective code rates), so that the flexibility of the signalling channels does not bind the signalling choices for the decisions made by the PDSCH scheduler. It is proposed that at least four code block positions will be searched by all the UEs.

As described above with reference to the FIGS. 3 to 13, the control channels are dimensioned so that they form a binary tree i.e. the most robust channel coding format for the longest information block length (IBL) is divisible to $2^x$ multiple code blocks depending on the depth of the tree.

The longest IBL is the downlink signalling entry, because it needs to allow flexible frequency multiplexing (F-FDM) scheme and asynchronous HARQ processing, which consume more bits than signalling for any other type of allocation. Thus, the downlink signalling entry coded with the lowest ECR will be designed to occupy one mother PDCCH. If the IBL of the uplink entry is close to the downlink entry, it will also occupy a mother PDCCH. If uplink entry is significantly smaller, e.g. close to $0.5*IBL_{DL}$, the uplink entry will be rate matched to one of the child PDCCHs. If downlink and uplink allocations, however, are designed to be possible to be placed to the same PDCCH, those will occupy a mother PDCCH instead. In this case, independent downlink signalling entries and uplink signalling entries will occupy one of the child PDCCHs each.

The most robust coding is selected from a set of $2^x$ code block sizes {ECR0, ECR1}, e.g. of order {1/6, 1/3} or {1/8, 1/4} or {1/8, 1/2}. By increasing the depth of the tree, also more code rate options are available, but this significantly increases the expected search process in the tree. Some choices may favour even more code rates as {1/6, 1/3, 2/3} or {1/8, 1/4, 1/2}.

The uplink signalling entry contains an IBL being about half of the size of the downlink signalling entry This is because in uplink only adjacent frequency multiplexing (A-FDM) allocation scheme is allowed. Further, the synchronous HARQ processes of uplink require less signalling. On the other hand, power control and timing advance may change the IBL to be close to equal to the downlink entry. An uplink entry may use ECR0 or ECR1 per UE.

The paging code block always requires a distributed transmission format to maximize its frequency diversity. Further, it does not include HARQ processes so that its signalling entry IBL is shorter than that of a downlink entry. The paging code block may be rate matched to the size of the most robust downlink code block, so that ECR0 is selected, but due to rate matching a slightly lower code rate will result. Alternatively, the paging code block may be rate matched to the size of the less robust downlink code block, so that ECR1 is selected, but due to rate matching a slightly higher code rate than ECR0 but a lower code rate than ECR1 will result. There is at maximum one paging signalling entry needed per sub-frame, because there is at maximum one PCH (paging channel) transport channel per sub-frame, which carries the paging messages of all the paged UEs.

The IBL of the RACH response signalling entry is close to equal size of the IBL of the other smallest entries. The RACH response may apply ECR0 or ECR1 respectively, because the RACH preamble is expected to indicate the rough CQI (channel quality indicator) level for the downlink transmission. There may be more than one RACH response signalling entries per sub-frame.

The downlink signalling entry of the uplink acknowledgements (AN code block) is a list format of positive or negative acknowledgements per UE allocation in the uplink sub-frame in a past sub-frame (k−Δk) preceding the current sub-frame (k). Each UE that had an allocation in sub-frame (k−Δk) will need to decode the common AN code block in sub-frame k. The position of the acknowledgement bit of each UE in the AN list field is determined by the position of that signalling entry in the tree, which has signalled the uplink allocation for the UE in sub-frame (k−Δk). As the tree is common, each UE will uniquely know the position of its allocation in the tree.

If the IBL sizes of the downlink and uplink allocations do not efficiently fit to the same binary tree, i.e. the $IBL_{DL} \sim 2*IBL_{UL}$ or $IBL_{DL} \sim IBL_{UL}$ does not hold, it may become reasonable to construct separate trees for the downlink and uplink allocations, respectively.

It is proposed here that even if the IBL of different signalling entries does not exactly match to the $2^x$ structure of the tree, the tree is constructed by rate matching. Thus, every signalling entry coded with ECR0 or ECR1 will be rate matched to force an exact fit to a control channel in the node of the tree. Regarding the rate matching, the same holds for other possible modular choices of a control channel structure than a tree.

As the tree structure requires the control channels to be $2^x$ structured, there are preferably three ways of achieving this:
  The bit-field design of the signalling entries is such that the IBL of each entry is dimensioned properly to follow the $2^x$ structure.
  Some extra RFU (reserved for future use) bits are added to the signalling entries to properly fulfil the $2^x$ structure.
  The IBLs are of arbitrary but known length and do not follow the $2^x$ structure directly, but still the code blocks do. This is achievable by rate matching the IBL with a given code rate to the $2^x$ structure. The penalty of this is that the rate matching factor also has to be blindly detected by the receiver. However, as the signalling entries and their IBL are known, there is also a known limited set of rate matching factors to search for. Another advantage is that the rate matching has to be done at limited nodes of the tree only.

It is possible to provide future signalling entries or modify the existing ones due to the modular structure of the PDCCHs. The possible changes to the signalling entries may require introduction of new rate matching factors, but that is considered a small effort. Compatibility to the earlier implementations is well preserved, as the modular control channel structure is possible to be searched through—both by the previously defined rate matching factors and by the newly added rate matching factors. All the code blocks realizing the previously defined rate matching factors can be found normally despite of the presence of entries with new rate matching definitions. Vice versa, the code blocks realizing new rate matching factors can be found normally despite of the presence of entries with old rate matching definitions.

Any code block may have any required power boosting, if the mean transmission power per OFDM symbol is kept constant. Power boosting may happen by exploiting the power available from the non-used symbol resources or between different code blocks of control channels assigned to different UEs. Demodulation of the control channel by QPSK and decoding of the control channel by a convolutional code are feasible operations without knowing the signal amplitude relative to the pilot symbols. Thus, power boosting is a practical solution, which does not require any specific signalling in this case. Any un-used sub-carrier symbol resources do not create any inter-cell interference to their co-channel symbols in the neighbouring cells.

The UE receiver is configured to search for allocation information from the PDCCHs mandated for it. However, there are many dependencies that do not require the UE search for all the signalling entries all the time. Such dependencies may include the UE state, the UE capability or knowledge of UE's active traffic flows.

In the LTE idle state, the UE only searches for paging signalling entries and does not need to apply other rate matching factors in its search.

If the UE created a RACH burst, it will search for RACH response and need not apply other rate matching factors in its search.

In a typical LTE active state operation, the UE does not need to search for rate matching factors of the paging entry nor the rate matching factors of the RACH response entry. The UE just needs to search for rate matching factors of the downlink entry and uplink entry.

It may be feasible that also downlink group entry and uplink group entry are defined for VoIP usage. Thus, if the UE has a VoIP session active, it will have to search rate matching factors both for downlink and downlink group entries and rate matching factors for uplink and uplink group entries.

Further, if the UE is dual codeword MIMO capable, it needs to search rate matching factors for the downlink MIMO signalling entry, if this is separately defined. However, in this case it is proposed that all signalling for this UE follows the MIMO entry format, and thus it would not need to search for regular downlink signalling entries at all.

Despite there are many different rate matching factors feasible in the nodes of the tree, the tree will be so defined that each UE will only need to search for those rate matching factors relevant for its expected signalling entry formats.

Figure 15:
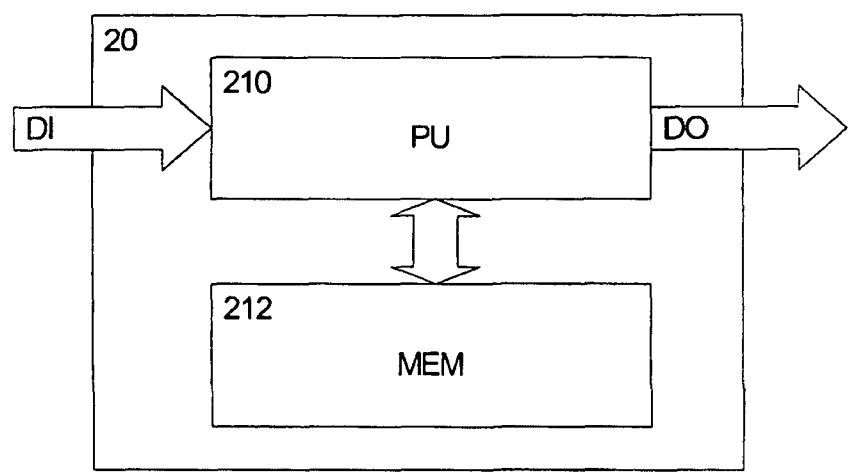
FIG. 15 shows a schematic block diagram of a computer-based implementation according to an embodiment.

FIG. 15 shows a schematic block diagram of a software-based implementation of the proposed advanced decoding procedure. Here, the UE 10 of FIG. 2 comprises a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the functionalities as described above. These processing steps may be performed on the basis of input data DI and may generate output data DO, wherein the input data DI may correspond to the received control information of the PDCCH 300 and the output data DO may correspond to the decoded allocation information. Consequently, the invention may be implemented as a computer program product comprising code means for generating each individual step of the decoding procedure according to the embodiment when run on a computer device or data processor.

In summary, a control channel structure includes at least one control channel to be allocated to a user for at least one of uplink and downlink directions in a network, which the at least one control channel is arranged as a modular structure comprising of modular code blocks on at least two different sizes. One of such modular structures may be represented as a tree structure in particular, where each of the modular code blocks define one node of the tree, respectively.

It is apparent that the invention can easily be extended to any kind of control channel where adaptive coding or modulation or other types of formats are used. Any pattern or sequence may be used for selecting and testing available types of formats. The described embodiments are related to control signaling via wireless channels. However, the invention, according to various embodiments, can be applied to control signaling via wired channels as well. Additionally, the invention can be applied to any device, apparatus, module or integrated chip where a control information is to be decoded. Exemplary embodiments may thus vary within the scope of the attached claims.

The invention claimed is:

1. A control channel structure including at least one control channel to be allocated at least to a user for at least one of uplink and downlink directions in a network, which the at least one control channel is arranged as at least a part of a modular structure comprising modular code blocks of at least two different sizes, wherein the modular structure forms a tree where each of the modular code blocks defines one node of the tree, respectively, wherein each of the nodes comprises signalling entries coded by a given code rate, wherein the modular structure of the at least one control channel allows user equipment specific separate coded control channels with limited and optimized number of searches, and wherein the signalling entries include information blocks, and each information block of a signalling entry is rate matched to a node of the tree.

2. The control channel structure according to claim 1, including a plurality of control channels to be allocated to users for at least one of uplink and downlink direction in a network, which control channels are arranged as a tree comprising nodes of modular code blocks on at least two different levels with each code block defining one control channel at a node of the tree.

3. The control channel structure according to claim 2, wherein the code blocks of different levels have different sizes.

4. The control channel structure according to claim 1, wherein the tree is a binary tree.

5. The control channel structure according to claim 1, wherein each node of the tree corresponds to a predetermined set of sub-carrier symbols.

6. The control channel structure according to claim 1, wherein the tree is a tree of variable code rates.

7. The control channel structure according to claim 1, wherein the at least one control channel is provided for signalling.

8. The control channel structure according to claim 7, wherein each of the signalling entries comprise a unified entry format.

9. The control channel structure according to claim 7, wherein at least some of the signalling entries are of different types.

10. The control channel structure according to claim 7, wherein the signalling entries include information blocks, and at least some of the signalling entries have a different information block length.

11. The control channel structure according to claim 10, wherein an uplink signalling entry comprises an information block length which is part, in particular half, of the information block length of a downlink signalling entry.

12. The control channel structure according to claim 1, wherein the tree is dimensioned according to a system bandwidth and/or according to predetermined channel code rates.

13. The control channel structure according to claim 1, wherein the tree is pruned to include a sub-set of nodes of all possible nodes only.

14. The control channel structure according to claim 1, wherein a code block in a level of higher order has a smaller size than a code block in a level of lower order.

15. The control channel structure according to claim 1, wherein power from a resource provided for a code block which is currently not used is available for at least another code block currently used.

16. The control channel structure according to claim 1, wherein at least a part of transmission power from a code block resource on sub-carriers in a node of the tree is available to be used on sub-carriers in another node of the tree.

17. A method for creating at least one control channel to be allocated at least to a user for at least one of uplink and downlink directions in a network, wherein the at least one control channel is arranged as at least a part of a modular structure comprising modular code blocks of at least two different sizes, wherein the modular structure is formed as a tree where each code block defines one node of the tree, respectively, wherein the nodes comprise signalling entries coded by a given code rate, wherein the modular structure of the at least one control channel allows user equipment specific separate coded control channels with limited and optimized number of searches, and wherein the signalling entries include information blocks, and each information block of a signalling entry is rate matched to a node of the tree.

18. The method according to claim 17, wherein a plurality of control channels to be allocated to users for at least one of uplink and downlink direction in a network are arranged as a tree comprising nodes of modular code blocks on at least two different levels with each code block defining one control channel at a node of the tree.

19. The method according to claim 18, wherein the code blocks of different levels are provided with different sizes.

20. The method according to claim 17, wherein the tree is provided as a binary tree.

21. The method according to claim 17, wherein each node of the tree corresponds to a predetermined set of sub-carrier symbols.

22. The method according to claim 17, wherein the tree is provided as a tree of variable code rates.

23. The method according to claim 17, wherein the at least one control channel is provided for signalling.

24. The method according to claim 23, wherein the signalling entries are provided with a unified entry format.

25. The method according to claim 23, wherein at least some of the signalling entries are of different types.

26. The method according to claim 23, wherein the signalling entries include information blocks, and at least some of the signalling entries have a different information block length.

27. The method according to claim 26, wherein an uplink signalling entry comprises an information block length which is part, in particular half, of the information block length of a downlink signalling entry.

28. The method according to claim 17, wherein the tree is dimensioned according to a system bandwidth and/or according to predetermined channel code rates.

29. The method according to claim 17, wherein the tree is pruned to include a sub-set of nodes of all possible nodes only.

30. The method according to claim 17, wherein a code block in a level of higher order has a smaller size than a code block in a level of lower order.

31. The method according to claim 17, wherein power from a resource for a code block which is currently not used is provided for at least another code block currently used.

32. The method according to claim 17, wherein at least a part of transmission power from a code block resource on sub-carriers in a node of the tree is provided to sub-carriers in another node of the tree.

33. A non-transitory computer program product comprising a code means for generating the steps of a method according to claim 17 when run on a computer device.

34. An apparatus comprising a transmitter for creating at least one control channel to be allocated at least to a user for at least one of uplink and downlink directions in a network, so that the at least one control channel is arranged as at least a part of a modular structure comprising modular code blocks of at least two different sizes, wherein the modular structure forms a tree where each of the modular code blocks defines one node of the tree, respectively, wherein each of the nodes comprises signaling entries coded by a given code rate, wherein the modular structure of the at least one control channel allows user equipment specific separate coded control channels with limited and optimized number of searches, and wherein the signaling entries include information blocks, and each information block of a signaling entry is rate matched to a node of the tree.

35. The apparatus according to claim 34, wherein the transmitter is configured to create a plurality of control channels to be allocated to users for at least one of uplink and downlink direction in a network so that the control channels are arranged as a tree comprising nodes of modular code blocks on at least two different levels with each code block defining one control channel at a node of the tree.

36. The apparatus according to claim 35, wherein the code blocks of different levels have different sizes.

37. The apparatus according to claim 34, wherein the tree is a binary tree.

38. The apparatus according to claim 34, wherein each node of the tree corresponds to a predetermined set of sub-carrier symbols.

39. The apparatus according to claim 34, wherein the tree is a tree of variable spreading factors or code rates.

40. The apparatus according to claim 34, wherein the at least one control channel is provided for signalling.

41. The apparatus according to claim 40, wherein the signalling entries comprise a unified entry format.

42. The apparatus according to claim 40, wherein at least some of the signalling entries are of different types.

43. The apparatus according to claim 40, wherein the signalling entries include information blocks, and at least some of the signalling entries have a different information block length.

44. The apparatus according to claim 43, wherein an uplink signalling entry comprises an information block length which is part, in particular half, of the information block length of a downlink signalling entry.

45. The apparatus according to claim 34, wherein the coding tree is dimensioned according to a system bandwidth and/or according to predetermined channel code rates.

46. The apparatus according to claim 34, wherein the tree is pruned to include a sub-set of nodes of all possible nodes only.

47. The apparatus according to claim 34, wherein a code block in a level of higher order has a smaller size than a code block in a level of lower order.

48. The apparatus according to claim 34, wherein power from a resource provided for a code block which is currently not used is available for at least another code block currently used.

49. The apparatus according to claim 34, wherein at least a part of transmission power from a code block resource on the sub-carriers in a node of the tree is available to be used on the sub-carriers in another node of the tree.

50. An integrated circuit comprising an apparatus according to claim 34.

51. A network device comprising an apparatus according to claim 34.

52. The network device according to claim 51, wherein said network device is a base station device.

53. A system, comprising:
a transmitter for creating at least one control channel to be allocated at least to a user for at least one of uplink and downlink directions in a network, so that the at least one control channel is arranged as at least a part of a modular structure comprising modular code blocks of at least two different sizes, wherein the modular structure forms a tree where each of the modular code blocks defines one node of the tree, respectively, wherein each of the nodes comprises signalling entries coded by a given code rate, wherein the modular structure of the at least one control channel allows user equipment specific separate coded control channels with limited and optimized number of searches, and wherein the signalling entries include information blocks, and each information block of a signalling entry is rate matched to a node of the tree.

* * * * *